United States Patent
Tamura

(10) Patent No.: US 7,286,475 B2
(45) Date of Patent: Oct. 23, 2007

(54) GPRS SYSTEM AND IN-ZONE NODE APPARATUS, AND BEARER SETTING METHOD USED THEREFOR

(75) Inventor: Toshiyuki Tamura, Tokyo (JP)

(73) Assignee: NEC Corporation, Tokyo (JP)

(*) Notice: Subject to any disclaimer, the term of this patent is extended or adjusted under 35 U.S.C. 154(b) by 876 days.

(21) Appl. No.: 10/400,470

(22) Filed: Mar. 28, 2003

(65) Prior Publication Data

US 2003/0186692 A1 Oct. 2, 2003

(30) Foreign Application Priority Data

Apr. 1, 2002 (JP) .............................. 2002-098126

(51) Int. Cl.
  H04Q 11/00 (2006.01)
  H04Q 7/20 (2006.01)
  H04L 12/28 (2006.01)
(52) U.S. Cl. ................... 370/230; 370/401; 370/395.2; 455/450; 455/452.1
(58) Field of Classification Search ................ 370/237, 370/230, 401, 395.2; 455/450, 452.1
  See application file for complete search history.

(56) References Cited

U.S. PATENT DOCUMENTS

| | | | |
|---|---|---|---|
| 6,683,853 B1* | 1/2004 | Kannas et al. | 370/237 |
| 6,970,694 B2* | 11/2005 | Shaheen | 455/414.1 |
| 7,106,718 B2* | 9/2006 | Oyama et al. | 370/340 |
| 7,123,920 B1* | 10/2006 | Faccin et al. | 455/450 |
| 7,164,673 B2* | 1/2007 | Jang | 370/338 |
| 2003/0186651 A1* | 10/2003 | Weston et al. | 455/39 |
| 2006/0128389 A1* | 6/2006 | Hurtta | 455/445 |

FOREIGN PATENT DOCUMENTS

| | | |
|---|---|---|
| JP | 2002-9840 | 1/2002 |
| JP | 2003-516032 | 5/2003 |
| JP | 2004-517509 | 6/2004 |
| WO | WO 99/37103 | 7/1999 |
| WO | WO 01/17291 A1 | 3/2001 |
| WO | WO 01/41376 A2 | 6/2001 |
| WO | WO 01/86974 A2 | 11/2001 |

OTHER PUBLICATIONS

European Search Report dated Feb. 20, 2004.

(Continued)

*Primary Examiner*—Barry Taylor
(74) *Attorney, Agent, or Firm*—McGinn IP Law Group, PLLC

(57) ABSTRACT

A GPRS system is provided which is capable of realizing speed-up of PDP context establishment and reduction of call connection time. At the time of the PDP context establishment, it is made possible to carry out bearer setting between an MS and an SGSN and bearer setting between the SGSN and a GGSN independently from each other. The SGSN can select a flexible bearer setting procedure based upon traffic data and the like (stored contents of a history database) managed in its own node. For example, in the case in which the SGSN can judge that both the bearer between the MS and the SGSN and the bearer between the SGSN and the GGSN have room, the SGSN executes the respective bearer setting substantially simultaneously.

21 Claims, 8 Drawing Sheets

OTHER PUBLICATIONS

Digital cellular telecommunications system (Phase2+) (GSM): Universal Mobile Telecommunications System (UMTS): General Packet Radio Service (GPRS) Service description; Stage.2 (3GPP TS 23.060 version 4.3.0 Release 4), ETSI TS 123 060 V4.3.0., Jan. 2002, Technical Specification, XP-002222634.

Japanese Office Action dated Oct. 17, 2006, with partial English Translation.

European Search Report dated May 11, 2007.

European Telecommunications Standards Institute, Jan. 2002, Digital Cellular Telecommunications System (Phase 2+) (GSM); Universal Mobile Telecommunications System (UMTS); General Packet Radio Service (GPRS) Service Description; Stage 2 (3GPP TS 23.060 version 4.3.0 Release 4).

* cited by examiner

FIG. 5A

RNC # 1

| REQUESTED MAX bps | DETERMINED MAX bps |
|---|---|
| 8 | 8 |
| 16 | 16 |
| 32 | 32 |
| 64 | 64 |
| 128 | 128 |
| 256 | 256 |
| 512 | 256 |
| 1024 | 512 |
| 2048 | 1024 |

FIG. 5B

RNC # 2

| REQUESTED MAX bps | DETERMINED MAX bps |
|---|---|
| 8 | 8 |
| 16 | 16 |
| 32 | 32 |
| 64 | 64 |
| 128 | 64 |
| 256 | 64 |
| 512 | 64 |
| 1024 | 128 |
| 2048 | 128 |

FIG. 6A

GGSN # 1

| REQUESTED MAX bps | DETERMINED MAX bps |
|---|---|
| 8 | 8 |
| 16 | 16 |
| 32 | 32 |
| 64 | 32 |
| 128 | 32 |
| 256 | 32 |
| 512 | 32 |
| 1024 | 128 |
| 2048 | 128 |

FIG. 6B

GGSN # 2

| REQUESTED MAX bps | DETERMINED MAX bps |
|---|---|
| 8 | 8 |
| 16 | 16 |
| 32 | 32 |
| 64 | 64 |
| 128 | 128 |
| 256 | 256 |
| 512 | 512 |
| 1024 | 1024 |
| 2048 | 2048 |

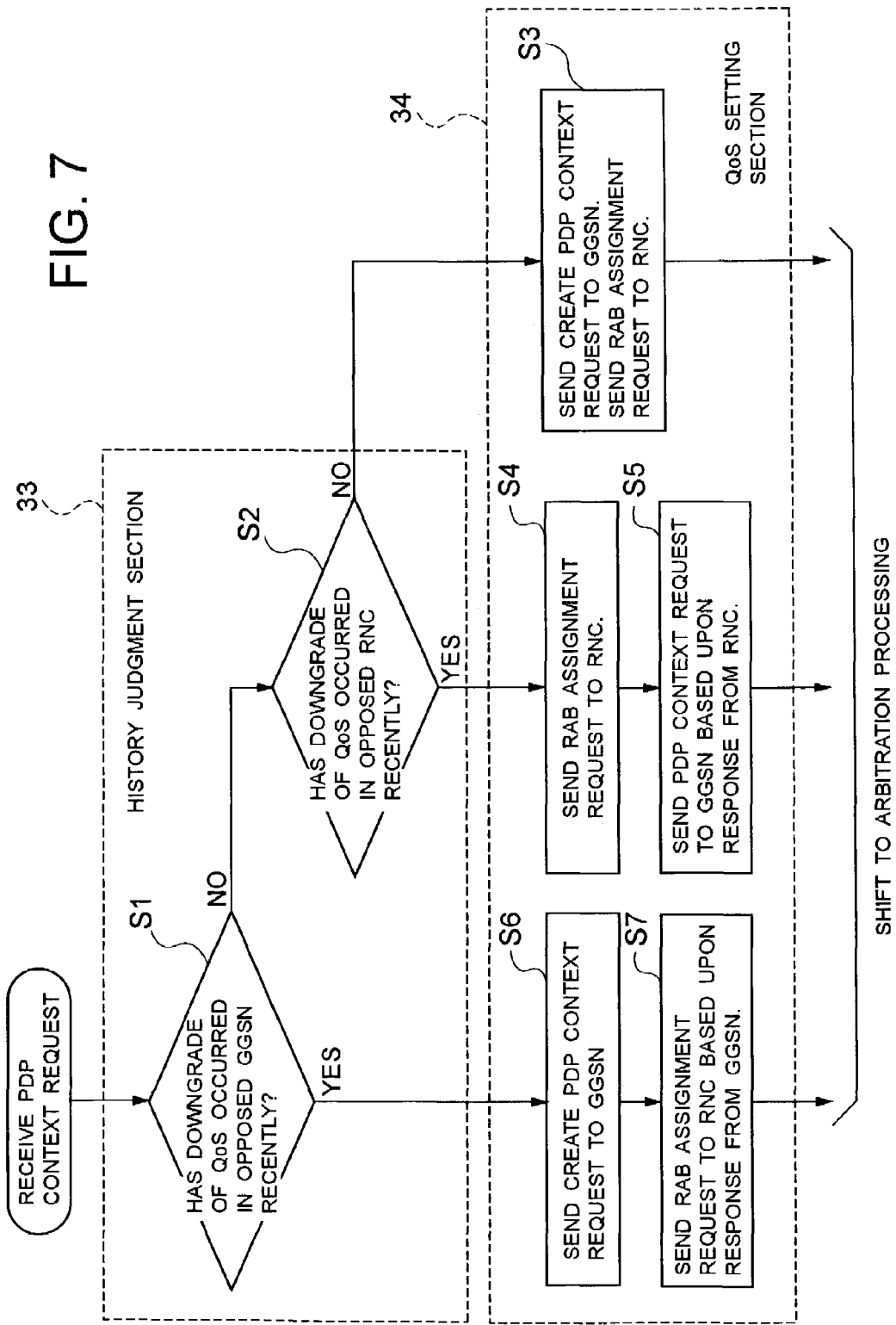

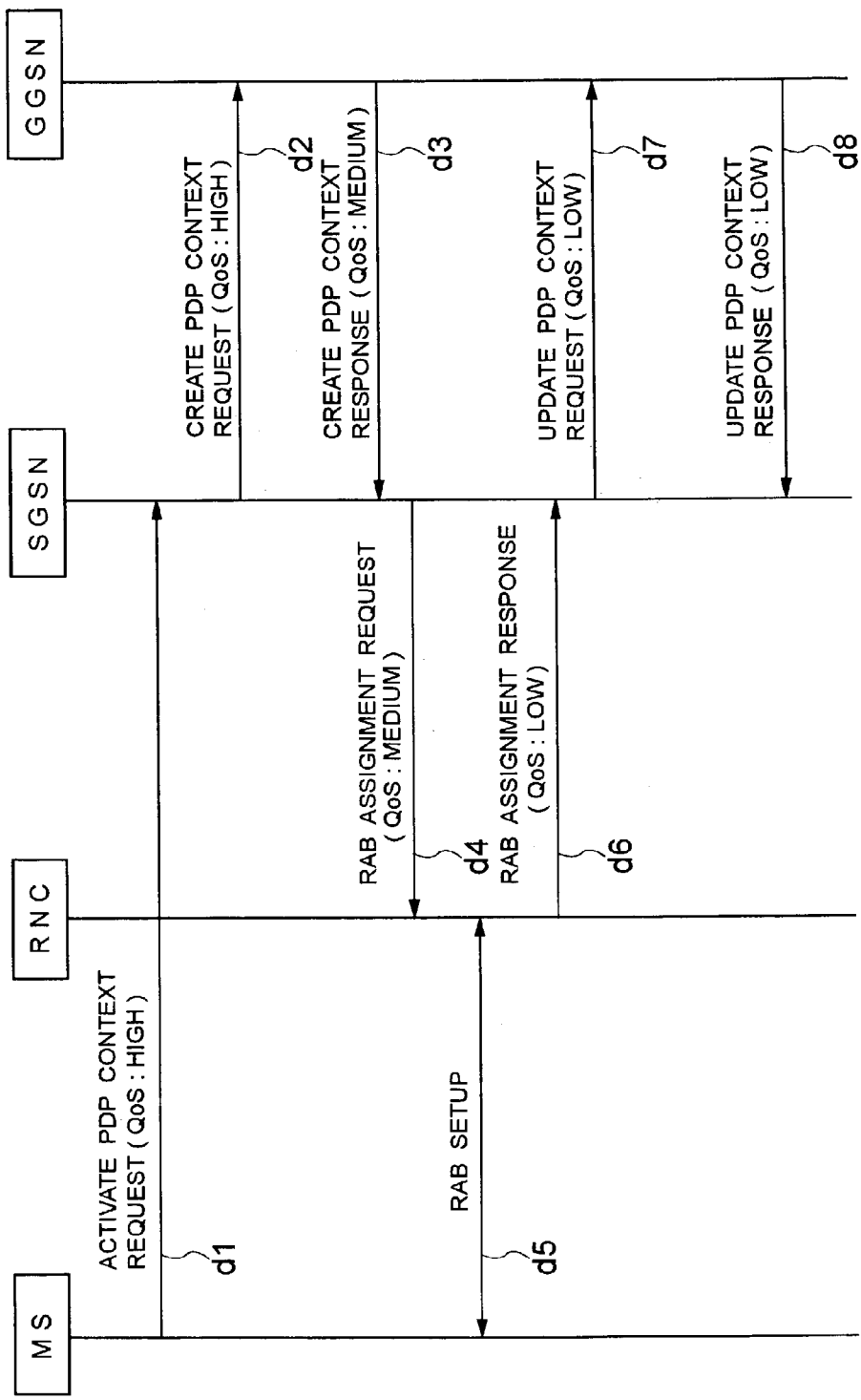

GPRS SYSTEM AND IN-ZONE NODE APPARATUS, AND BEARER SETTING METHOD USED THEREFOR

BACKGROUND OF THE INVENTION

1. Field of the Invention

The present invention relates to a GPRS (General Packet Radio Service) system and an in-zone node apparatus, and a bearer setting method used therefor, and in particular to a bearer setting method in the GPRS system.

2. Description of the Prior Art

The GPRS system is a mobile packet communication system for transferring data sent and received by data terminals, in a form of a packet without change even within a mobile communication network. With this system, it has become possible to provide even information having a real-time nature (e.g., voices, moving images), which mainly provided by circuit switching in the past, by introducing QoS (Quality of service) control satisfying service qualities (speed, delay, etc.) into a packet communication system.

As this QoS control, a PDP (Packet Data Protocol) context (PDP context) is established among an MS (Mobile Station), an RNC (Radio Network Controller), an SGSN (Serving GPRS Support Node) (in-zone node), and a GGSN (Gateway GPRS Support Node) (gateway node) which constitute the GPRS system. Note that the MS and the SGSN are connected by an RAN (Radio Access Network) and the SGSN and the GGSN are connected by a core network (backbone network).

Here, main functions of the SGSN include in-zone subscriber information management, in-zone subscriber movement management, outgoing and incoming call control, tunneling control, charging control, and QoS control. Main functions of the GGSN include ISP (Internet Services Provider) access management, address management, outgoing and incoming call control, tunneling control, charging control, and QoS control.

Concerning a procedure for the PDP context establishment in the present 3GPP (Third Generation Partnership Projects) standard, FIG. 8 shows a message flow in view of the QoS.

When this procedure for the PDP context establishment is examined from the standpoint of the SGSN, in order to guarantee the QoS required by the MS, both of a bearer between the MS and the SGSN and a bearer between the SGSN and GGSN have to be able to provide a frequency band width (Throughput) satisfying the QoS.

As shown in FIG. 8, in the procedure for the PDP context establishment in the present 3GPP standard, QoS negotiation between the SGSN and GGSN is carried out first, and based upon a result of the QoS negotiation, setting of an RAB (Radio Access Bearer) is carried out.

That is, when an activate PDP contest request (QoS: High) (e.g., speed of 2 Mbps) is sent from the MS (d1 in FIG. 8), the SGSN sends a create PDP context request (QoS: High) to the GGSN (d2 in FIG. 8).

However, a bearer satisfying "QoS: High" (speed of 2 Mbps) of this PDP context request cannot be secured in the GGSN, and if the bearer satisfying "QoS: Medium" (e.g., speed of 1 Mbps) (QoS Downgrade) is secured, the GGSN sends a create PDP context response (QoS: Medium) to the SGSN (d3 in FIG. 8).

Thus, the SGSN sends an RAB assignment request (QoS: Medium) to the RNC (d4 in FIG. 8). The RNC performs RAB setup between the RNC and the MS (d5 in FIG. 8).

In this case, if the QoS is downgraded due to a reason that the RAB cannot be secured sufficiently or the like in the RAB setup, the RNC sends an RAB assignment response (QoS: Low) (e.g., speed of 500 Kbps) to the SGSN (d6 in FIG. 8).

Therefore, the SGSN sends an update PDP context request (QoS: Low) to the GGSN (d7 in FIG. 8). Since the already secured QoS is downgraded in the GGSN, the QoS is not further downgraded, and the GGSN sends an update PDP context response (QoS: Low) to the SGSN (d8 in FIG. 8). Consequently, the bearer satisfying "QoS: Low" is secured as a route from the MS to the GGSN.

In the case in which the bearer satisfying the QoS cannot be provided between the MS and the SGSN as described above, the bearer between the SGSN and the GGSN is changed (reset) according to the downgraded QoS between the MS and the SGSN. According to this procedure, it becomes possible to make the QoS of the bearer provided between the MS and the SGSN and the QoS of the bearer provided between the SGSN and the GGSN to coincide with each other.

In the bearer setting method in the above-described conventional GPRS system, a secure QoS negotiation is made possible by the present procedure carrying out sequential bearer setting processing. Thus, it is likely that this sequential bearer setting processing becomes a factor of delay in PDP context establishment, and there is a problem in that smooth connection to the Internet from the MS becomes difficult.

BRIEF SUMMARY OF THE INVENTION

It is an object of the present invention to solve the above-described problems and provide a GPRS system and an in-zone apparatus which can realize speed-up of PDP context establishment and reduction of call connection time, and a bearer setting method used therefor.

A GPRS system according to the present invention is a GPRS (General Packet Radio Service) system which performs PDP (Packet Data Protocol) context establishment for QoS (Quality of service) control between a mobile station and a gateway node to be connected via an in-zone node, in which bearer setting between the mobile station and the in-zone node for performing the PDP context establishment and bearer setting between the in-zone node and the gateway node are performed independently from each other in the in-zone node.

An in-zone node apparatus according to the present invention is an in-zone node apparatus of a GPRS (General Packet Radio Service) system which performs PDP (Packet Data Protocol) context establishment for QoS (Quality of service) control between a mobile station and a gateway node to be connected via its own node, in which bearer setting between the in-zone node apparatus and the mobile station for performing the PDP context establishment and bearer setting between the in-zone node apparatus and the gateway node are performed independently from each other.

A bearer setting method according to the present invention is a bearer setting method for a GPRS (General Packet Radio Service) system which performs PDP (Packet Data Protocol) context establishment for QoS (Quality of service) control between a mobile station and a gateway node to be connected via an in-zone node, with which bearer setting between the mobile station and the in-zone node for performing the PDP context establishment and bearer setting between the in-zone node and the gateway node are performed independently from each other.

A recording medium according the present invention is a recording medium having recorded therein a program for a bearer setting method for a GPRS (General Packet Radio Service) system performing PDP (Packet Data Protocol) context establishment for QoS (Quality of service) control between a mobile station and a gateway node to be connected via an in-zone node, in which the program is adopted to cause a computer to execute processing for causing the GPRS system to perform bearer setting between the mobile station and the in-zone node for performing the PDP context establishment and bearer setting between the in-zone node and the gateway node independently from each other.

That is, in the GPRS system of the present invention, when the PDP context is established, it is made possible to carry out the bearer setting between the MS and the SGSN and the bearer setting between the SGSN and the GGSN independently from each other, whereby speed-up of the PDP context establishment (packet session establishment) becomes possible.

In addition, the SGSN can select a flexible bearer setting procedure based upon traffic data and the like which are managed in its own node. For example, in the case in which the SGSN can judge that both of the bearer between the MS and the SGSN and the bearer between the SGSN and the GGSN have room, it becomes possible to execute the respective bearer setting substantially simultaneously.

BRIEF DESCRIPTION OF THE DRAWINGS

In the accompanying drawings:

FIGS. 5A and 5B are tables showing registered contents of a history database of FIG. 1;

FIGS. 6A and 6B are tables showing registered contents of the history database of FIG. 1;

FIG. 7 is a flow chart showing an example of operation of the SGSN of FIG. 1; and FIG. 8 is a sequence chart showing a procedure for a PDP context establishment in a 3GPP standard.

DETAILED DESCRIPTION OF THE PREFERRED EMBODIMENTS

Figure 1:
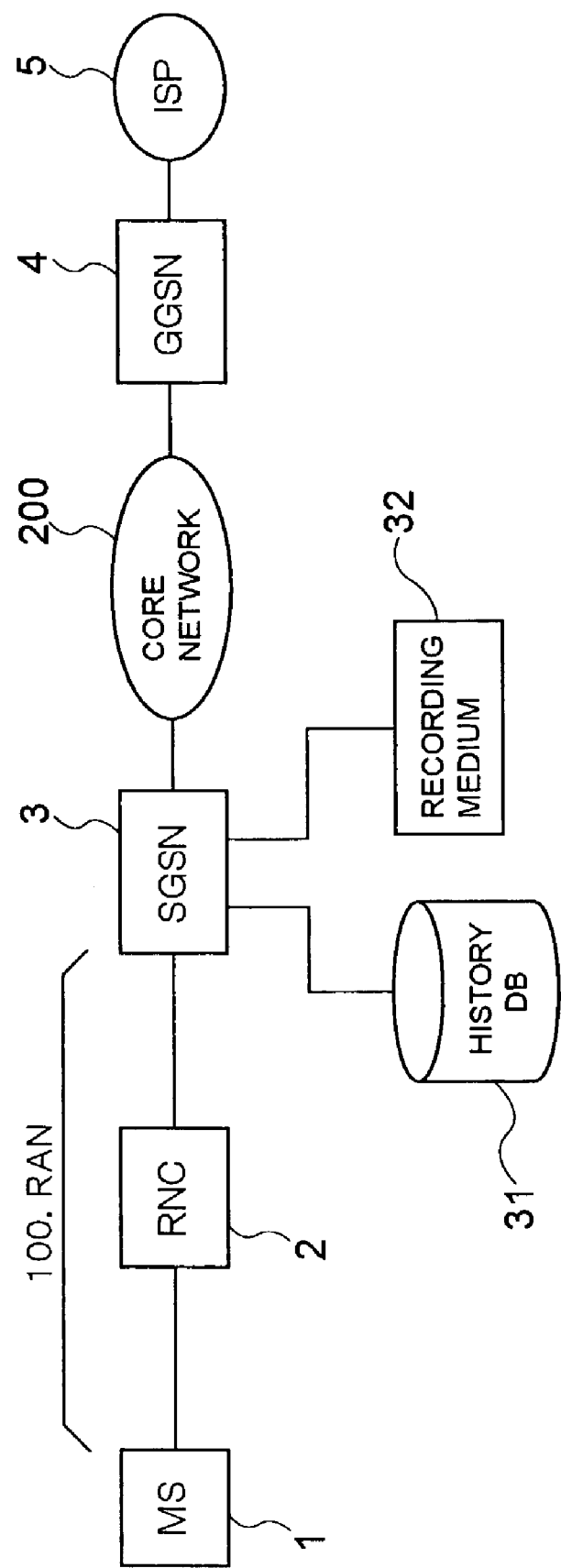
FIG. 1 is a block diagram showing a structure of a GPRS system according to an embodiment of the present invention.

An embodiment of the present invention will be described with reference to the accompanying drawings. FIG. 1 is a block diagram showing a structure of a GPRS (General Packet Radio Service) system according to an embodiment of the present invention. In FIG. 1, the GPRS system according to the embodiment of the present invention includes an MS (Mobile Station) 1, an RNC (Radio Network Controller) 2, an SGSN (Serving GPRS Support Node) (in-zone node) 3, a GGSN (Gateway GPRS Support Node) (gateway node) 4, an ISP (Internet Services Provider) 5, and a core network (backbone network) 200.

The SGSN 3 is provided with a history database (DB) 31, which stores a history (traffic data and the like managed in its own node) of bearer setting between the MS 1 and the SGSN 3 and bearer setting between the SGSN 3 and the GGSN 4, and a recording medium 32, which records a program to be executed by a computer serving as a main component of the SGSN 3. Note that the MS 1 and the SGSN 3 are connected by an RAN (Radio Access Network) 100.

The GPRS system according to the embodiment of the present invention adopts a mobile packet communication system for transferring data sent and received by MS 1 (data terminal), in a form of a packet without change even within a mobile communication network (RAN 100 and core network 200). With this system, it has become possible to provide even information having a real-time nature (e.g., voices, moving images), which mainly provided by circuit switching, by introducing QoS (Quality of service) control satisfying service qualities (speed, delay, etc.) into a packet communication system.

Main functions of the SGSN 3 include in-zone subscriber information management, in-zone subscriber movement management, outgoing and incoming call control, tunneling control, charging control, and QoS control. Main functions of the GGSN 4 include ISP access management, address management, outgoing and incoming call control, tunneling control, charging control, and QoS control.

In this embodiment, PDP (Packet Data Protocol) context (PDP context) establishment is performed among the MS 1, the RNC 2, the SGSN 3, and the GGSN 4 as the QoS control.

Figure 2:
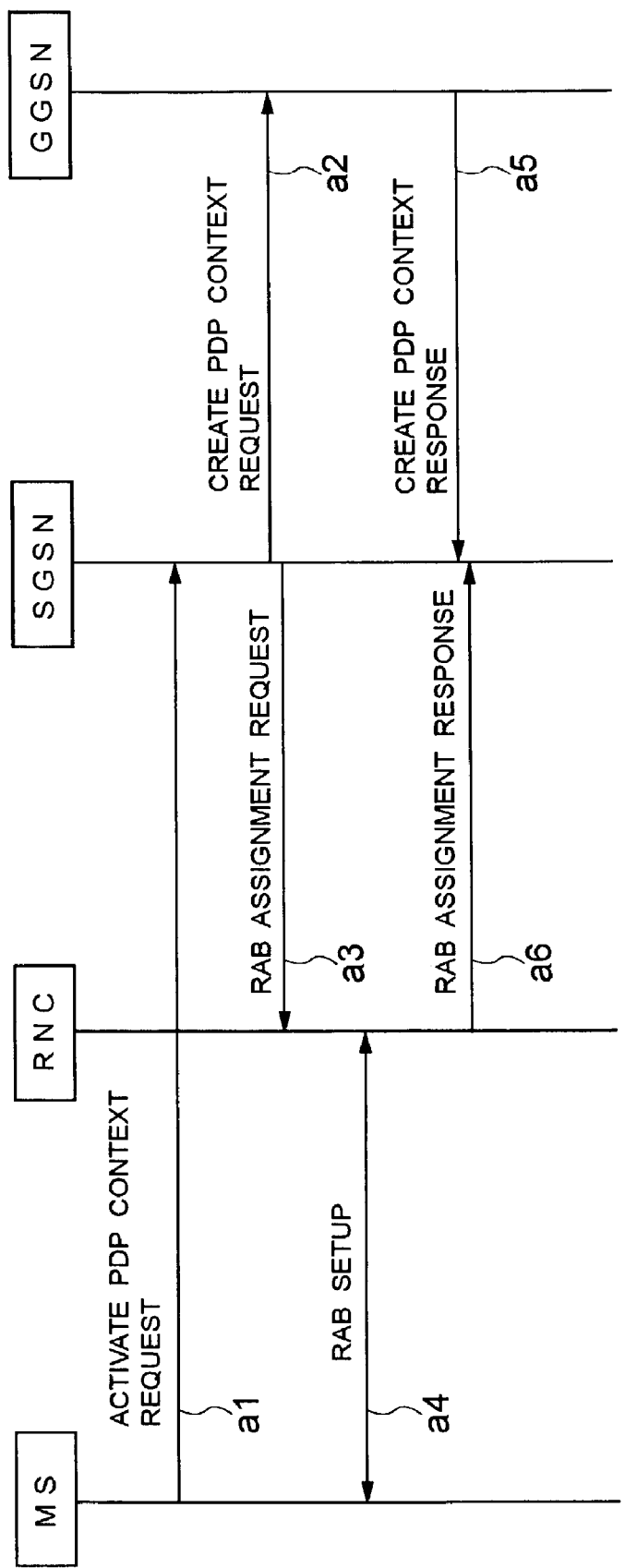
FIG. 2 is a sequence chart showing bearer setting processing in the GPRS system according to the embodiment of the present invention.
Figure 3:
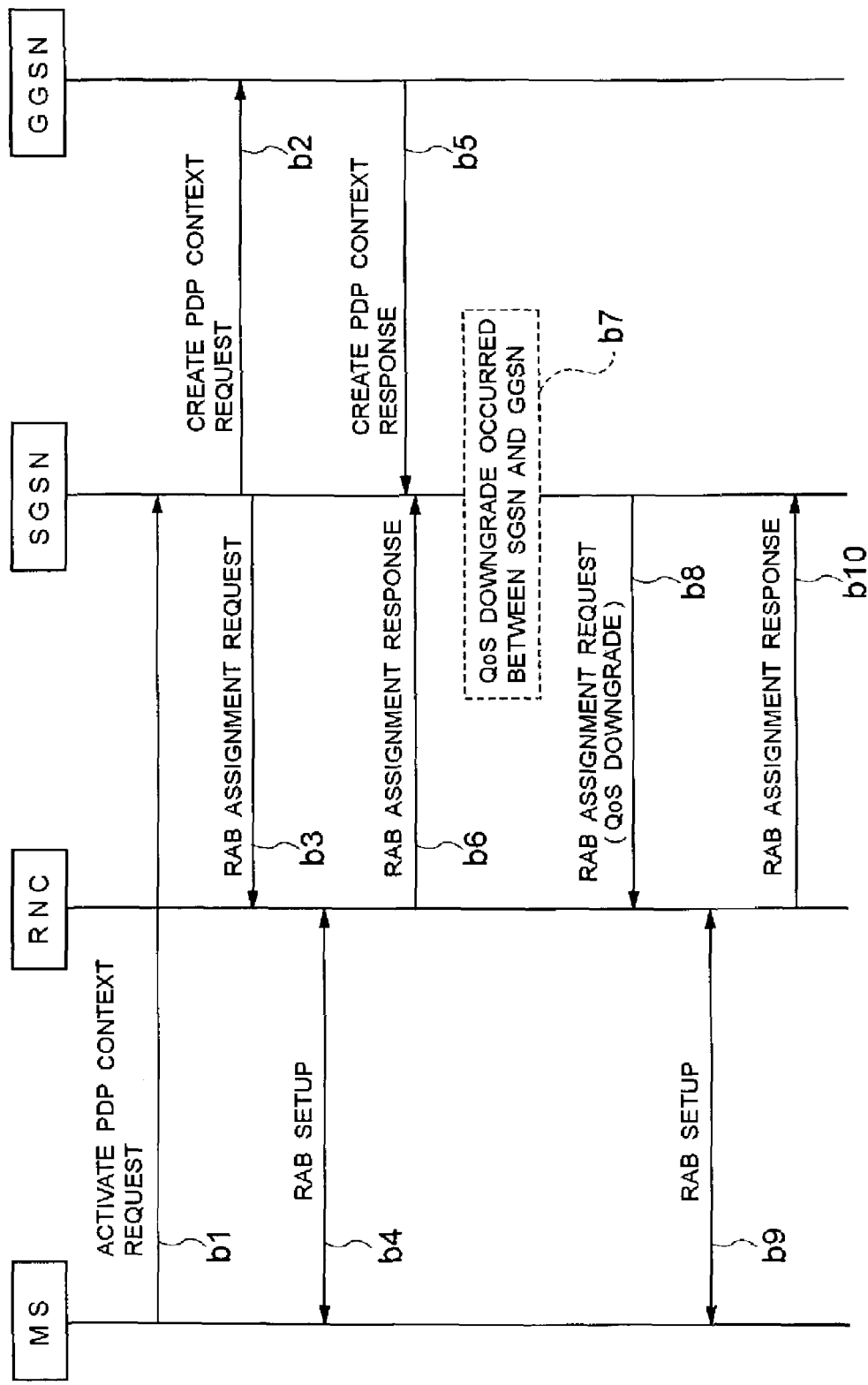
FIG. 3 is a sequence chart showing bearer setting processing in the GPRS system according to the embodiment of the present invention.
Figure 4:
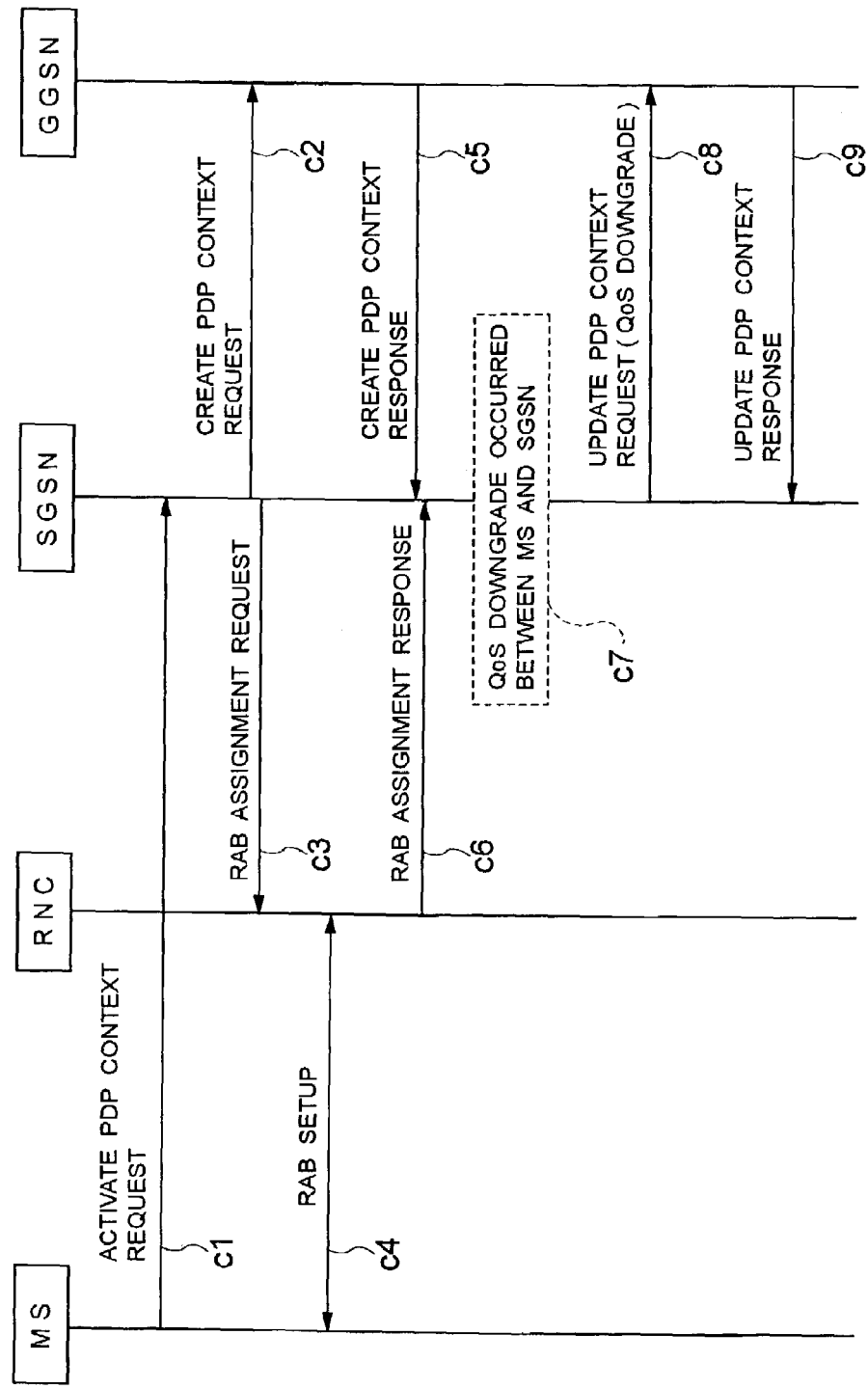
FIG. 4 is a sequence chart showing bearer setting processing in the GPRS system according to the embodiment of the present invention.

FIGS. 2 to 4 are sequence charts showing bearer setting processing in the GPRS system according to the embodiment of the present invention. The bearer setting processing in the GPRS system according to the embodiment of the present invention will be described with reference to FIGS. 1 to 4. Here, operations concerning the SGSN 3 among processing operations shown in FIGS. 2 to 4 are realized by a computer executing a program of the recording medium 32.

When an activate PDP context request is sent from the MS 1 (a1 in FIG. 2), the SGSN 3 sends a create PDP context request to the GGSN 4 (a2 in FIG. 2) and, at the same time, sends an RAB (Radio Access Bearer) assignment request to the RNC 2 (a3 in FIG. 2).

Upon securing a bearer satisfying a QoS of this PDP context request, the GGSN 4 sends a create PDP context response to the SGSN 3 (a5 in FIG. 2).

On the other hand, the RNC 2 performs RAB setup between the RNC 2 and the MS 1 (a4 in FIG. 2) and, upon succeeding in securing an RAB sufficiently, sends an RAB assignment response to the SGSN 3 (a6 in FIG. 2).

Consequently, a bearer satisfying the QoS can be secured as a route from the MS1 to the GGSN 4. That is, in the case of a GPRS system which is capable of providing a QoS requested by the MS 1 almost surely, since the GPRS system can always execute bearer setting between the SGSN 3 and the GGSN 4 and bearer setting between the MS 1 and the SGSN 3 substantially simultaneously, speed-up of PDP context establishment (packet session establishment) can be achieved.

On the other hand, bearer setting processing in the case in which downgrade of a QoS has accidentally occurred between the SGSN 3 and the GGSN 4 in the above-described bearer setting processing will be described with reference to FIG. 3.

When an activate PDP context request is sent from the MS 1 (b1 in FIG. 3), the SGSN 3 sends a create PDP context request to the GGSN 4 (b2 in FIG. 3) and, at the same time, sends an RAB assignment request to the RNC 2 (b3 in FIG. 3).

Upon securing a bearer satisfying a QoS of this PDP context request, the GGSN 4 sends a create PDP context response to the SGSN 3 (b5 in FIG. 3). The RNC 2 performs RAB setup between the RNC 2 and the MS1 (b4 in FIG. 3) and, upon succeeding in securing an RAB sufficiently, sends an RAB assignment response to the SGSN 3 (b6 in FIG. 3).

In this case, upon detecting that downgrade of the QoS has accidentally occurred between the SGSN 3 and the GGSN 4 (b7 in FIG. 3), the SGSN 3 sends an RAB assignment request with downgraded QoS to the RNC 2 (b8 in FIG. 3).

The RNC 2 performs RAB setup between the RNC 2 and the MS 1 (b9 in FIG. 3) and, upon succeeding in securing an RAB with downgraded QoS, sends an RAB assignment response to the SGSN 3 (b10 in FIG. 3). Consequently, a bearer satisfying the downgraded QoS is secured as a route from the MS 1 to the GGSN 4.

Next, bearer setting processing in the case in which downgrade of the QoS has accidentally occurred between the MS 1 and the SGSN 3 in the above-described bearer setting processing will be described with reference to FIG. 4.

When an activate PDP context request is sent from the MS 1 (c1 in FIG. 4), the SGSN 3 sends a create PDP context request to the GGSN 4 (c2 in FIG. 4) and, at the same time, sends an RAB assignment request to the RNC 2 (c3 in FIG. 4).

Upon securing a bearer satisfying a QoS of this PDP context request, the GGSN 4 sends a create PDP context response to the SGSN 3 (c5 in FIG. 4). The RNC 2 performs RAB setup between the RNC 2 and the MS 1 (c4 in FIG. 4) and, upon succeeding in securing an RAB sufficiently, sends an RAB assignment response to the SGSN 3 (c6 in FIG. 4).

In this case, upon detecting that downgrade of the QoS has accidentally occurred between the MS 1 and the SGSN 3 (c7 in FIG. 4), the SGSN 3 sends an update PDP context request with downgraded QoS to the GGSN 4 (c8 in FIG. 4).

Since the already secured QoS is downgraded in the GGSN 4, the QoS is not further downgraded, and the GGSN 4 sends an update PDP context response to the SGSN 3 (c9 in FIG. 4). Consequently, a bearer satisfying the downgraded QoS is secured as a route from the MS 1 to the GGSN 4.

FIGS. 5A and 5B and FIGS. 6A and 6B are tables showing registered contents of the history database 31 of FIG. 1. FIGS. 5A and 5B show bearer traffic data between the MS 1 and the SGSN 3, which are managed by a unit of RNC. FIGS. 6A and 6B show bearer traffic data between the SGSN 3 and the GGSN 4, which are managed by a unit of GGSN.

FIG. 5A shows bearer traffic data (history of bearer setting) of an RNC #1 and indicates that a QoS requested at 512 bps has been downgraded to 256 bps, a QoS requested at 1024 bps has been downgraded to 512 bps, and a QoS requested at 2048 bps has been downgraded to 1024 bps.

FIG. 5B shows bearer traffic data (history of bearer setting) of an RNC #2 and indicates that a QoS requested at 128 bps has been downgraded to 64 bps, a QoS requested at 256 bps has been downgraded to 64 bps, a QoS requested at 512 bps has been downgraded to 64 bps, a QoS requested at 1024 bps has been downgraded to 128 bps, and a QoS requested at 2048 bps has been downgraded to 128 bps.

FIG. 6A shows bearer traffic data (history of bearer setting) of a GGSN #1 and indicates that a QoS requested at 64 bps has been downgraded to 32 bps, a QoS requested at 128 bps has been downgraded to 32 bps, a QoS requested at 256 bps has been downgraded to 32 bps, a QoS requested at 512 bps has been downgraded to 32 bps, a QoS requested at 1024 bps has been downgraded to 128 bps, and a QoS requested at 2048 bps has been downgraded to 128 bps.

FIG. 6B shows bearer traffic data (history of bearer setting) of a GGSN #2 and indicates that a requested QoS has not been downgraded. That is, in the case in which traffic data managed/referred to in the inside of the SGSN 3 is bearer traffic data between the MS 1 and the SGSN 3, the SGSN 3 manages the traffic data by a unit of RNC and manages a QoS which is downgraded with respect to an RAB assignment request of a requested QoS. In addition, in the case in which traffic data managed/referred to in the inside of the SGSN 3 is bearer traffic data between the SGSN 3 and the GGSN 4, the SGSN 3 manages the traffic data by a unit of GGSN and manages a QoS which is downgraded with respect to a requested QoS.

FIG. 7 is a flow chart showing an example of operation of the SGSN 3 of FIG. 1. In FIG. 7, as the example of operation of the SGSN 3, an example of processing for determining an order of bearer setting based upon the traffic data shown in FIGS. 5 and 6 is shown, and in particular operations of a history judgment section 33 and a QoS setting section 34 of the SGSN 3 are shown.

Operations of the SGSN 3 will be described with reference to FIG. 1 and FIGS. 5 to 7. Note that the operations of the history judgment section 33 and the QoS setting section 34 of the SGSN 3 shown in FIG. 7 are realized by the computer executing the program in the recording medium 32.

The history judgment section 33 of the SGSN 3 is started up when the SGSN 3 receives an activate PDP context request from the MS 1, and, concerning the GGSN 4 which is requested connection from the MS 1, refers to downgrade information in the past with respect to a requested QoS in the history database 31. As a result of this reference, in the case in which it is found that downgrade of a QoS has been occurred, since it is likely that downgrade of a QoS occurs with the current PDP context setting, the history judgment section 33 attempts bearer setting between the SGSN 3 and the GGSN 4 first.

That is, when the history judgment section 33 of the SGSN 3 judges that downgrade of a QoS has occurred in the opposed GGSN 4 recently (step S1 in FIG. 7), the QoS setting section 34 sends a create PDP context request to the GGSN 4 (step S6 in FIG. 7). Then, upon receiving a create PDP context response from the GGSN 4, the QoS setting section 34 sends an RAB assignment request to the RNC 2 based upon the response (step S7 in FIG. 7).

Thereafter, if downgrade occurs more, the QoS setting section 34 performs arbitration processing as described above until a bearer satisfying a downgraded QoS is secured.

In addition, in the case in which it is found that, concerning the GGSN 4, downgrade of a QoS has not occurred as a result of referring to downgrade information of the history database 31, the history judgment section 33 of the SGSN 3 refers to downgrade information in the past with respect to a required QoS in the history database 31 concerning the RNC 2 corresponding to the GGSN 4. As a result of this reference, in the case in which it is found that downgrade of a QoS has occurred, since it is likely that downgrade of a QoS will occur even with the current PDP context setting, the history judgment section 33 attempts bearer setting between the MS 1 and the SGSN 3 first.

That is, when the history judgment section 33 of the SGSN 3 judges that downgrade of a QoS has occurred in the opposed RNC 2 recently (step S2 in FIG. 7), the QoS setting section 34 sends an RAB assignment request to the RNC 2 (step S4 in FIG. 7). Then, upon receiving an RAB assignment response from the RNC 2, the history judgment section 33 sends a PDP context request to the GGSN 4 based upon the response (step S5 in FIG. 7).

Thereafter, if downgrade occurs more, the QoS setting section 34 performs arbitration processing as described above until a bearer satisfying a downgraded QoS is secured.

On the other hand, in the case in which it is found that, concerning the GGSN 4 and the RNC 2, downgrade of a QoS has not occurred both in the GGSN 4 and the RNC 2 as a result of referring to downgrade information of the history database 31 (steps S1 and S2 in FIG. 7), the history judgment section 33 of the SGSN 3 carries out bearer setting between the SGSN 3 and the SGSN 4 and bearer setting between the MS 1 and the SGSN 3 simultaneously (step S3 in FIG. 7).

Thereafter, if downgrade accidentally occurs concerning the GGSN 4 and the RNC 2, the QoS setting section 34 performs arbitration processing as described above until a bearer satisfying a downgraded QoS is secured.

In this way, in the case of the GPRS system which is capable of providing a QoS requested by MS 1 almost surely, since the bearer setting between the SGSN 3 and the GGSN 4 and the bearer setting between the MS 1 and the SGSN 3 can be executed simultaneously, speed-up of the PDP context establishment (packet session establishment) can be achieved.

As shown in FIG. 2, in a general case in which downgrade of a QoS does not occur, as a result of simulating the above-described bearer setting processing, it has been found that an effect can be obtained in that time for establishing a PDP context is reduced by 22.3% compared with the present 3GPP procedure.

In addition, since the present GPRS system will be applied also to an IMS [IP (Internet Protocol) Multimedia Subsystem] in future, speed-up of packet session establishment is considered to be equivalent to reduction of call connection time. Therefore, this effect is significant.

As described above, in the present invention, in the GPRS system for performing PDP context establishment for QoS control between the mobile station and the gateway node to be connected via the in-zone node, the bearer setting between the mobile station and the in-zone node for performing PDP context establishment and the bearer setting between the in-zone node and the gateway node are performed independently from each other, whereby an effect is obtained in that speed-up of the PDP context establishment and reduction of call connection time can be realized.

What is claimed is:

1. A mobile communications system, comprising:
   a mobile station (MS);
   a radio network controller (RNC);
   an in-zone node; and
   a gateway node,
   wherein said in-zone node transmits a first request to create packet data protocol (PDP) context to said gateway node and receives a first response to the first request from said gateway node,
   said in-zone node transmits a second request to assign a radio access bearer (RAB) to said RNC and receives a second response to the second request from said RNC,
   said in-zone node transmits said second request before receiving said first response, and
   said in-zone node transmits said first request before receiving said second response.

2. The mobile communications system according to claim 1,
   wherein said in-zone node transmits a third request to assign a downgraded RAB to said RNC when detecting a downgrade between said in-zone node and said gateway node, and
   said in-zone node receives a third response to the third request from said RNC.

3. The mobile communications system according to claim 1,
   wherein said in-zone node transmits a fourth request to update said PDP context to a downgraded PDP context to said gateway node when detecting a downgrade between said in-zone node and said MS, and
   said in-zone node receives a fourth response to the fourth request from said gateway node.

4. The mobile communications system according to claim 1,
   wherein said in-zone node transmits the first request and the second request after receiving a fifth request to activate said PDP context from said MS.

5. The mobile communications system according to claim 1,
   wherein said RNC sets up a RAB between said RNC and said MS.

6. The mobile communications system according to claim 1,
   wherein said in-zone node comprises a Serving GPRS (General Packet Radio Service) Support Node.

7. The mobile communications system according to claim 1,
   wherein said gateway node comprises a Gateway GPRS Support Node.

8. A mobile communications system, comprising:
   a mobile station (MS);
   a radio network controller (RNC);
   an in-zone node;
   a gateway node; and
   a history data base to register a history of bearer traffic data,
   wherein said in-zone node transmits a first request to create packet data protocol (PDP) context to said gateway node and receives a first response to the first request from said gateway node, and
   said in-zone node transmits a second request to assign a radio access bearer (RAB) to said RNC and receives a second response to the second request from said RNC, and
   wherein said in-zone node transmits the second request based on the first response when the history indicates a downgrade with respect to said gateway node.

9. A mobile communications system, comprising:
   a mobile station (MS);
   a radio network controller (RNC);
   an in-zone node;
   a gateway node; and
   a history data base to register a history of bearer traffic data,
   wherein said in-zone node transmits a first request to create packet data protocol (PDP) context to said gateway node and receives a first response to the first request from said gateway node, and
   said in-zone node transmits a second request to assign a radio access bearer (RAB) to said RNC and receives a second response to the second request from said RNC, and wherein said in-zone node transmits the first request based on the second response when the history indicates a downgrade with respect to said in-zone node.

10. A communications method used in a mobile communications system having a mobile station (MS), a radio network controller (RNC), an in-zone node, and a gateway node, comprising:
said in-zone node transmitting a first request to create packet data protocol (PDP) context to said gateway node;
said in-zone node receiving a first response to the first request from said gateway node;
said in-zone node transmitting a second request to assign a radio access bearer (RAB) to said RNC; and
receiving a second response to the second request from said RNC,
wherein said in-zone node transmits said second request before receiving said first response, and
said in-zone node transmits said first request before receiving said second response.

11. The communications method according to claim 10, further comprising:
said in-zone node transmitting a third request to assign a downgraded RAB to said RNC when detecting a downgrade between said in-zone node and said gateway node; and
said in-zone node receiving a third response to the third request from said RNC.

12. The communications method according to claim 10, further comprising:
said in-zone node transmitting a fourth request to update said PDP context to a downgraded PDP context to said gateway node when detecting a downgrade between said in-zone node and said MS; and
said in-zone node receiving a fourth response to the fourth request from said gateway node.

13. The communications method according to claim 10, further comprising:
said in-zone node transmitting the first request and the second request after receiving a fifth request to activate said PDP context from said MS.

14. The communications method according to claim 10, further comprising:
said RNC setting up a RAB between said RNC and said MS.

15. The communications method according to claim 10, wherein said in-zone node comprises a Serving GPRS (General Packet Radio Service) Support Node.

16. The communications method according to claim 10, wherein said gateway node comprises a Gateway GPRS Support Node.

17. A communications method used in a mobile communications system having a mobile station (MS), a radio network controller (RNC), an in-zone node, and a gateway node, comprising:
said in-zone node transmitting a first request to create packet data protocol (PDP) context to said gateway node;
said in-zone node receiving a first response to the first request from said gateway node;
said in-zone node transmitting a second request to assign a radio access bearer (RAB) to said RNC; and
said in-zone node receiving a second response to the second request from said RNC,
wherein the mobile communications system comprises a history data base to register a history of bearer traffic data, and
wherein said in-zone node transmits the second request based on the first response when the history indicates a downgrade with respect to said gateway node.

18. A communications method used in a mobile communications system having a mobile station (MS), a radio network controller (RNC), an in-zone node, and a gateway node, comprising:
said in-zone node transmitting a first request to create packet data protocol (PDP) context to said gateway node;
said in-zone node receiving a first response to the first request from said gateway node;
said in-zone node transmitting a second request to assign a radio access bearer (RAB) to said RNC; and
said in-zone node receiving a second response to the second request from said RNC,
wherein the mobile communications system comprises a history data base to register a history of bearer traffic data; and
wherein said in-zone node transmits the first request based on the second response when the history indicates a downgrade with respect to said in-zone node.

19. A mobile communications system, comprising:
a mobile station (MS);
radio network control means for controlling a radio network;
an in-zone node; and
gateway means for performing a gateway function,
wherein said in-zone node transmits a first request to create packet data protocol (PDP) context to said gateway means and receives a first response to the first request from said gateway means, and
said in-zone node transmits a second request to assign a radio access bearer (RAB) to said radio network control means and receives a second response to the second request from said radio network control means, and
wherein said in-zone node transmits said second request before receiving said first response, and
said in-zone node transmits said first request before receiving said second response.

20. A mobile communications system, comprising:
a mobile station (MS);
radio network control means for controlling a radio network;
an in-zone node;
gateway means for performing a gateway function; and
history storing means for storing a history of bearer traffic data,
wherein said in-zone node transmits a first request to create packet data protocol (PDP) context to said gateway means and receives a first response to the first request from said gateway means, and
said in-zone node transmits a second request to assign a radio access bearer (RAB) to said radio network control means and receives a second response to the second request from said radio network control means, and
wherein said in-zone node transmits the second request based on the first response when the history indicates a downgrade with respect to said gateway node.

21. A mobile communications system, comprising:
a mobile station (MS);
radio network control means for controlling a radio network;

an in-zone node;
gateway means for performing a gateway function; and
history storing means for storing a history of bearer traffic data,
wherein said in-zone node transmits a first request to create packet data protocol (PDP) context to said gateway means and receives a first response to the first request from said gateway means, and
said in-zone node transmits a second request to assign a radio access bearer (RAB) to said radio network control means and receives a second response to the second request from said radio network control means, and wherein said in-zone node transmits the first request based on the second response when the history indicates a downgrade with respect to said in-zone node.

* * * * *